United States Patent [19]

DePauw

[11] 3,863,643
[45] Feb. 4, 1975

[54] DISCHARGE CHUTE AND EXPANSION CHAMBER FOR AN AXIAL FLOW-TYPE COMBINE

[75] Inventor: Richard A. DePauw, East Moline, Ill.

[73] Assignee: International Harvester Company, Chicago, Ill.

[22] Filed: June 29, 1973

[21] Appl. No.: 375,249

[52] U.S. Cl. ............................................ 130/27 T
[51] Int. Cl. ............................................ A01f 12/44
[58] Field of Search..... 130/27 T, 27 R, 27 F, 27 T, 130/27 P, 27 Z

[56] References Cited
UNITED STATES PATENTS
3,669,122 6/1972 Rowland-Hill ................... 130/27 T

*Primary Examiner*—Louis G. Mancene
*Assistant Examiner*—J. N. Eskovitz
*Attorney, Agent, or Firm*—F. David AuBuchon; Floyd B. Harman

[57] ABSTRACT

A discharge chute and expansion chamber designed for installation at the terminal end of the rotor casing of an axial flow-type harvesting combine. The expansion chamber exists by reason of the chute and it provides, in effect, an area of increased diameter within the rotor casing where the threshed residue material may move away from the rotor under the influence of centrifugal force without binding against the casing for free fall to a discharge means.

12 Claims, 2 Drawing Figures

DISCHARGE CHUTE AND EXPANSION CHAMBER FOR AN AXIAL FLOW-TYPE COMBINE

The present invention relates generally to harvesting combines and has particular reference to that type of combine which is commonly referred to as an axial flow-type combine wherein the crop material flows axially through an open-ended casing within which there is disposed a rotor. The invention is specifically concerned with a discharge chute and expansion chamber which is disposed at the terminal or rear of the rotor casing, the chamber existing by reason of the chute and constituting, in effect, a clearance area of increased diameter within the otherwise generally cylindrical casing where the threshed residue material is flung radially outwardly and away from the rotor under the influence of centrifugal force so that it may adjust itself to a condition of equilibrium where it is no longer closely confined by the wall of the rotor casing so that it is free to fall by gravity to a region of discharge.

Heretofore, where conventional axial combines are concerned, congestion of material at or near the discharge end of the rotor casing has presented certain difficulties in connection with combine operation and maintenance, one such difficulty arising from the fact that the only freefall area for the material is that area which directly opposes the discharge opening or chute which is provided at the bottom of the rotor casing immediately beneath the rotor. in the remaining circumferential region of the rotor casing at the terminal end thereof, the material is closely confined between the rotor and the wall of the casing where it is to a certain extent compressed by the oncoming material issuing from the separating region of the casing. Thus, expulsion of material through the discharge opening is a forced expulsion and entails a consequent consumption of horsepower. Any material that is not released as it passes the discharge opening must be recirculated and occupies space that should be free for oncoming material from the separating region.

The present invention overcomes this abovenoted limitation not only by reason of the provision of the aforementioned expansion chamber but also by reason of the fact that the clearance area for expansion of the material is enhanced by the use of a smaller reduced diameter rotor section in the expansion area.

The provision of an axial flow combine such as has briefly been outlined above constitutes the principal object of the present invention. Other objects and advantages of the invention will readily suggest themselves as the following description ensues.

In the accompanying two sheets of the drawings forming a part of this specification, one illustrative embodiment of the invention has been shown.

Figure 1:
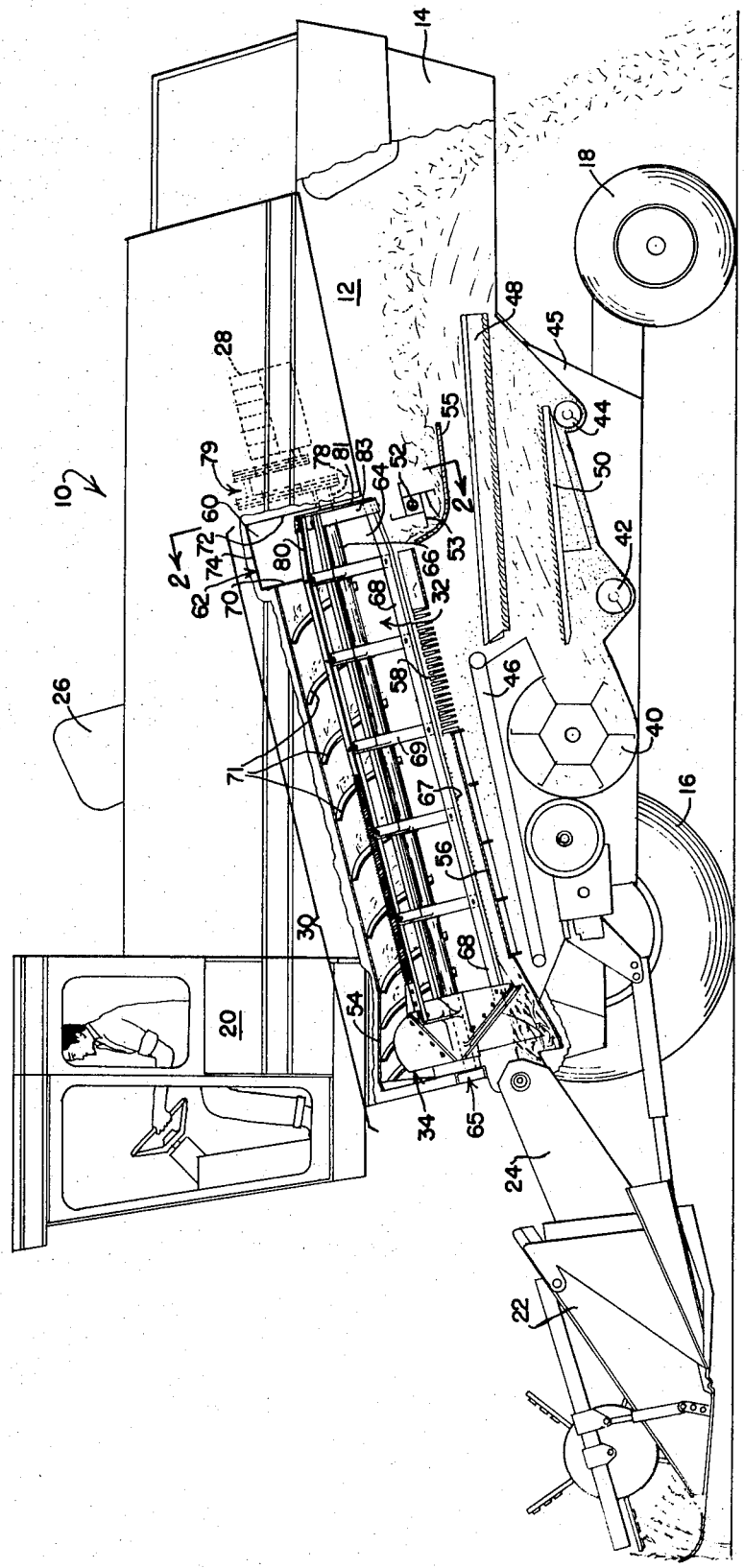
FIG. 1 is a side elevational view of an axial flow-type combine embodying the principles of the present invention, a major portion of one side wall being removed to reveal the crop-impelling means, the crop gathering means, the crop feeding means, the crop-impelling means, the axial threshing and separating means, the grain handling and cleaning means, and the crop residue discharge means which embodies the discharge hood and expansion chamber.

Referring now to the drawings in detail and in particular to FIG. 1, an axial flow-type combine is designated in its entirety by the reference numeral 10, the combine being of the general type shown and described in U.S. Pat. No. 3,481,342, granted on Dec. 2, 1969 and entitled AXIAL FLOW-TYPE COMBINE. The combine 10 involves in its general organization a chassis or body portion 12 having vertical side walls 14, the body portion being supported by a pair of relatively large drive wheels 16 in the front region of the combine, and a pair of steerable or dirigible wheels 18 at the rear of the combine. The combine further includes an operator's platform and cab 20, a crop-gathering header 22, a feeder 24, a grain elevator 26 and an engine 28. A grain tank (not shown) is enclosed within the walls of the body portion 12.

As is the case in connection with axial flow-type combines of the character under consideration, the axial threshing and separating means are embodied in a single unit in the form of an elongated and generally cylindrical member 30 which provides a rotor casing having a rotor 32 mounted therein. The forward end of the rotor 32 carries a vaned impeller 34 of the helix type. Other conventional components not specifically related to the present invention, and which are more or less schematically disclosed herein, are the blower 40, grain auger 42 leading to the aforementioned grain elevator 26, and a tailings auger 44, these components being enclosed within a lower casing section 45 beneath the chassis or body portion 12. Disposed beneath the cylindrical rotor casing and within the body portion 12 is an elongated generally flat endless conveyor which receives separated grain from the concave and grate sections of such member and conducts such grain rearwardly for discharge onto a chaffer sieve 48. Such sieve is reciprocated in a fore and aft direction so as to pass grain and tailings to a grain sieve 50 which also is reciprocated to separate the grain from the tailings so that the grain passes through such sieve and into the grain auger 42 while the tailings are delivered rearwardly to the tailings auger 44. The grain in the auger 42 is delivered by elevator means 26 to the grain tank, while the tailings are returned to the rotor casing 30 by elevator means (not shown). A terminal beater 52 which is disposed beneath the rear end of the rotor casing 30 prepares the straw residue for discharge from the combine rearwardly thereof.

Still referring to FIG. 1, the elongated cylindrical rotor casing 30 extends along the longitudinal axis of the combine 10 and the forward end thereof is provided with a frusto-conical transition section 54 which is so termed because it represents a funnel-like entrance mouth by means of which material that is fed rearwardly from the feeder 24 in the form of a relatively wide mat is shrunk, so to speak, and caused to enter the remaining rearward portion of the rotor casing for threshing and separating functions which are performed within the casing upon the material.

The impeller 34 is provided with a vane arrangement which closely mates with the inner frusto-conical surface of the transition section 54. The material which enters the truly cylindrical portion of the casing 30 is processed as it travels rearwardly, the threshed grain escaping from the casing mainly through the apertured bottom which is made up of a concave 56 and a grate 58. The upper portion of the cylindrical portion of casing 30 is also apertured. The straw and other waste material is conducted rearwardly from the separating region of the rotor casing 30 and enters an expansion chamber 60 which exists by reason of a discharge chute 62 which opens downwardly and provides a straw discharge opening or outlet 64 in the lower region of the casing 30 at the extreme rear end thereof. The rotor 32 is rotatably journalled for operation within the rotor casing 30 and it is provided with a central axial rotor shaft 66 which has its forward end supported in a transverse bar 65 that constitutes a fixed component of the combine chassis 12. Rotor blades 68 having rasp bars 67 thereon extend longitudinally of the casing 30 and are carried on on spiders 69 mounted on the rotor shaft 66 at spaced regions therealong. A series of helical transport fins 71 on the upper surface of the casing 30 function to index the material axially through the casing.

The arrangement of parts thus far described, with the exception of the discharge chute 62 and its associated expansion chamber 60, is purely conventional and no claim is made herein to any novelty associated with the same, the novelty of the present invention residing rather in the provision of the chute 62 and chamber 60 which will now be more fully described and subsequently claimed.

Figure 2:
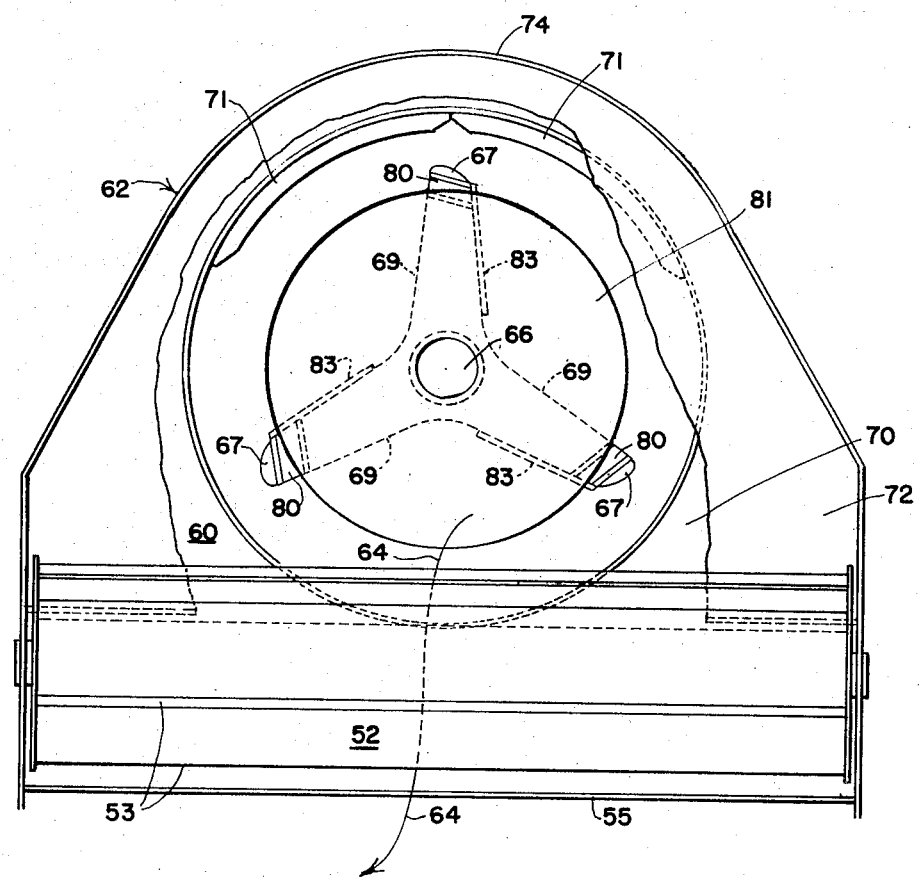
FIG. 2 is an enlarged sectional view taken substantially on the line 2—2 of FIG. 1.

Referring now, additionally, to FIG. 2, the discharge chute 62 is, in effect, an irregular continuation or extension of the cylindrical rotor casing 30. It embodies a vertical front and rear walls 70 and 72 respectively, a connecting arched top wall 74, and vertical side walls 75, the lower region of the chute being open and establishing a straw discharge outlet 64. The rotor casing 30 communicates with the expansion chamber 60 through the front wall 70. The rear end of the rotor shaft 66 is rotatably supported in the rear wall 72, the shaft projecting rearwardly beyond such wall as indicated at 78 and being operatively connected to the engine 28 by a suitable drive connection, as for example a Reeves drive mechanism 79 or the like. The rotor 32 thus projects through the front wall of the discharge chute 62 and across the interior of the chute where a series of rotor blade members or extensions 80 converge toward each other and thus define a rotor section wherein the mean effective diameter of the rotor is decreased. This relatively small diameter rotor section, in combination with the enlarged area afforded by the expansion chamber 60, creates a generally annular space for receiving residue crop material which passes rearwardly from the casing 30, and within which such material may expand in a manner and for a purpose that will be made clear presently.

In order to create a condition of turbulence within the expansion chamber 60, a terminal disk 81 is mounted on the rotor shaft 66 in close proximity to the rear wall 72 and carries a series of flat paddle members 83 having laterally turned ends 85 anchored to the converging blades 80.

A transversely extending curved chute 55 is located below the straw discharge outlet and is coextensive therewith. Terminal beater 52 which has a plurality of paddle blades 53 extends transversely and overlies chute 55 and is coextensive therewith.

In the operation of the herein described discharge chute 62 and expansion chamber 60, the crop material which has been treated in the cylindrical section of the rotor casing 30 by the usual threshing and separating procedures involving the concave 56, rasp bars 67, rotor blades 68 and grate 58, enters the expansion chamber 60 through the front wall 70. Due to the increased space within this chamber, the material no longer is confined by the outer wall of the rotor casing 30 and it has ample room for expansion as it is flung radially outwardly by centrifugal force from the converging rotor blade portions 80 in the reduced diameter section of the rotor. This material is thus free to adjust itself, so to speak, to a condition of equilibrium, after which it is free to fall under the influence of gravitational force through the discharge opening or outlet 64 where it is received by the terminal beater 52 and thus discharged from the combine to the surface of the ground as portrayed in FIG. 1. By reason of this expansion of the material in the chamber 60 little or no effort is required to force the material through the discharge outlet 64 and, as a consequence, engine horsepower is conserved.

The material issuing from outlet 64 encounters terminal beater 52 which in cooperation with chute 55 propels the material rearwardly such that it passes through the combine straw discharge opening.

The invention is not to be limited to the exact arrangement of parts shown in the accompanying drawings or described in this specification as various changes in the details of construction may be resorted to without departing from the spirit of the invention. Therefore, only insofar as the invention has particularly been pointed out in the accompanying claims is the same to be limited.

What is claimed is:

1. In an axial flow combine, in combination, an elongated generally cylindrical rotor casing defining a front crop-impelling region, a crop-threshing region, a crop-separating region, and a rear crop residue-expansion region therealong, successively and in the order named, a rotor disposed within said casing in coaxial relationship and substantially coextensive therewith, cooperating crop-impelling, crop-threshing and crop-separating instrumentalities on said rotor and casing in said impelling, threshing and separating regions respectively, the lower portion of said rotor casing in said residue expansion region being provided with a downwardly opening discharge outlet for crop residue, the wall of said rotor casing in said crop residue expansion region being displaced radially outwardly along substantially its entire three hundred and sixty degree circumference from the extended generally cylindrical confines of the casing in the adjacent crop separating region, thus defining an expansion chamber for the crop residue issuing from such latter region and flung from the rotor, whereby such residue may assume a state of equilibrium and fall by gravity through said discharge outlet.

2. The invention as set forth in claim 1 wherein a transversely extending terminal beater is located below said downwardly opening discharge outlet for propelling the discharged material rearwardly.

3. The invention as set forth in claim 2 wherein a curved chute is provided below said terminal beater and cooperates therewith.

4. In an axial flow combine, the combination set forth in claim 1, wherein the effective mean diameter of the rotor in said expansion chamber is appreciably less than the effective diameter thereof in said threshing and separating regions.

5. In an axial flow combine, the combination set forth in claim 2, wherein the effective mean diameter of the rotor in said expansion chamber is appreciably less than the effective diameter thereof in said threshing and separating regions.

6. In an axial flow combine, the combination set forth in claim 3, wherein the effective mean diameter of the rotor in said expansion chamber is appreciably less than the effective diameter thereof in said threshing and separating regions.

7. In an axial flow combine, the combination set forth in claim 1, wherein said crop-threshing and crop-separating instrumentalities include a series of elongated eccentrically disposed axially extending rotor blade sections on the rotor in said threshing and separating regions, and a similar series of rotor blade sections are disposed on the rotor in said expansion chamber, the eccentricity of the blades in said latter chamber are appreciably less than that of the blades in the threshing and separating regions, whereby the effective mean diameter of the rotor in said expansion chamber is less than the effective diameter of the rotor in said threshing and separating regions.

8. In an axial flow combine, the combination set forth in claim 7, wherein said rotor blade sections in the expansion chamber converge toward one another in the rear direction of the rotor casing.

9. In an axial flow combine, the combination set forth in claim 7 including, additionally, a series of paddles on said rotor in said expansion chamber for establishing a condition of air turbulence within such chamber.

10. In an axial flow combine, the combination set forth in claim 9, wherein said expansion chamber is defined by the provision of a discharge hood embodying vertical front and rear walls, an arched top wall, and vertical side walls, the lower end of said hood being open and defining said discharge outlet.

11. In an axial flow combine, the combination set forth in claim 10, wherein a circular terminal disk is mounted on the rotor shaft in close proximity to said rear wall, and said paddles are in the form of flat plates secured to the forward face of said terminal disk in edge-to-face relationship.

12. In an axial flow combine, the combination set forth in claim 11, wherein said paddles are substantially radially disposed relative to the rotor shaft and project inwardly from the periphery of the circular terminal disk.

* * * * *